(12) United States Patent
Wheeler et al.

(10) Patent No.: US 9,996,069 B2
(45) Date of Patent: Jun. 12, 2018

(54) PROGRAM GENERATION FOR A UNIVERSAL CONTROL SYSTEM

(71) Applicant: Logitech, Inc., Newark, CA (US)

(72) Inventors: Stephen James Wheeler, Ottawa (CA); Xavier Caine, San Jose, CA (US); Amish Rajesh Babu, Mountain View, CA (US); Matthew Jonathan Dickinson, Berkeley, CA (US); John Craig Robert Degruchy, Ancaster (CA); Prajith Puthiyedath Eringathody, Malappuram (IN)

(73) Assignee: LOGITECH, INC., Newark, CA (US)

( * ) Notice: Subject to any disclaimer, the term of this patent is extended or adjusted under 35 U.S.C. 154(b) by 221 days.

(21) Appl. No.: 14/935,367

(22) Filed: Nov. 6, 2015

(65) Prior Publication Data

US 2017/0131697 A1   May 11, 2017

(51) Int. Cl.
*G05B 19/042* (2006.01)
*H04L 12/28* (2006.01)

(52) U.S. Cl.
CPC ...... *G05B 19/0426* (2013.01); *H04L 12/2809* (2013.01); *H04L 12/2814* (2013.01); *H04L 12/2816* (2013.01); *G05B 2219/23258* (2013.01); *G05B 2219/25341* (2013.01); *G05B 2219/2642* (2013.01)

(58) Field of Classification Search
CPC ...... G05B 19/0426; G05B 2219/23258; G05B 2219/25341; G05B 2219/2642; H04L 12/2809; H04L 12/2814; H04L 12/2816
See application file for complete search history.

(56) References Cited

U.S. PATENT DOCUMENTS

| | | | |
|---|---|---|---|
| 6,788,241 B2* | 9/2004 | Arling | G08C 17/00 340/12.24 |
| 7,024,256 B2* | 4/2006 | Krzyzanowski | H04L 12/2803 700/65 |
| 2004/0056789 A1 | 3/2004 | Arling et al. | |
| 2004/0207535 A1* | 10/2004 | Stevenson | G08C 19/28 340/4.31 |
| 2009/0239587 A1 | 9/2009 | Negron et al. | |
| 2011/0037574 A1 | 2/2011 | Pratt et al. | |
| 2014/0118122 A1* | 5/2014 | Ryu | H04L 12/2814 340/12.52 |

OTHER PUBLICATIONS

Harmony Smart Control: User Guide, Logitech, 2013, pp. 1-43.*
Non-final Office Action for U.S. Appl. No. 14/935,368, dated Feb. 13, 2018, 13 pages.

* cited by examiner

*Primary Examiner* — Mark Connolly
(74) *Attorney, Agent, or Firm* — Artegis Law Group, LLP

(57) ABSTRACT

A computer-implemented method for programming a universal control system includes generating a list of devices associated with a network; based on configuration data and statistical data associated with a first set of devices included in the list of devices, generating programming for a first activity to be performed via the network, wherein first activity is associated with the first set of devices included in the list of devices, and the programming is associated with a device configuration for the first set of devices and includes commands for transmission to the first set of devices by the universal control system; and causing the programming for the first activity to be stored, wherein, when the first activity is selected, the device configuration for the first set of devices is implemented.

21 Claims, 7 Drawing Sheets

PROGRAM GENERATION FOR A UNIVERSAL CONTROL SYSTEM

BACKGROUND OF THE INVENTION

Field of the Invention

The present invention relates generally to controlling a set of devices, including home automation and entertainment systems and, more specifically, to program generation for a universal control system.

Description of the Related Art

Remote control units, or "remotes," are commonly used in homes and businesses to control electrically powered devices, such as lighting fixtures and motorized window shades, and electronic devices, such as televisions, stereo receivers, audio-video receivers, DVD players, CD players, set-top cable boxes, and the like. Because of the large number of electronic devices currently available, the so-called "universal remote" has been developed, which is a type of remote control unit that enables control of multiple different electronic devices with a single device.

Some universal remotes allow for the programming of a programming sequence, which is a series of wireless commands that can be initiated by pressing a single button on the universal remote. For example, to operate a television in conjunction with a stereo system so that the stereo system receives sound input from the television, a user may program a programming sequence for this activity. In this case, the programming sequence may include a series of suitable wireless commands that will turn on the television, turn on the stereo system, and then switch the input to the stereo system receiver to receive audio input from the television (rather than from a CD player or some other device). Thus, by pressing a single button, a user can configure and activate the appropriate components of a home entertainment system for a particular activity.

With more complex home entertainment systems, however, programming a universal remote with a programming sequence can be a time-consuming and frustrating process, even with universal remotes designed to partially automate the programming process. In particular, accurate programming of a particular programming sequence generally requires very specific knowledge of the configuration of each and every device that receives a command as part of the programming sequence. For instance, a properly functioning programming sequence cannot be programmed without correctly programming exactly which source device (cable box, DVD player, game console, etc.) is connected to which input of an audio-video receiver or stereo receiver, which input a display device to be used is on, and so on. The typical end-user does not have such information readily available and, therefore, must resort to physical verification of the exact connectivity and other characteristics of each electronic device to be controlled.

As the foregoing illustrates, there is a need for more effective techniques for program generation for a universal control system.

SUMMARY OF THE INVENTION

One embodiment of the present invention sets forth a computer-implemented method for generating a program for a universal control system. The method includes generating a list of devices associated with a home; based on configuration data and statistical data associated with a first set of devices included in the list of devices, generating programming for a first activity to be performed via the network, wherein the first activity is associated with the first set of devices included in the list of devices, and the programming is associated with a device configuration for the first set of devices and includes commands for transmission to the first set of devices by the universal control system; and causing the programming for the first activity to be stored, wherein, when the first activity is selected, the device configuration for the first set of devices is implemented.

One advantage of the disclosed embodiment is that a universal control system can be programmed with little or no user input or feedback. In addition, when user feedback is employed, the feedback does not require detailed knowledge of devices on the part of the user, and may be as simple as confirmation of correct operation of a selected activity.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

Figure 1:
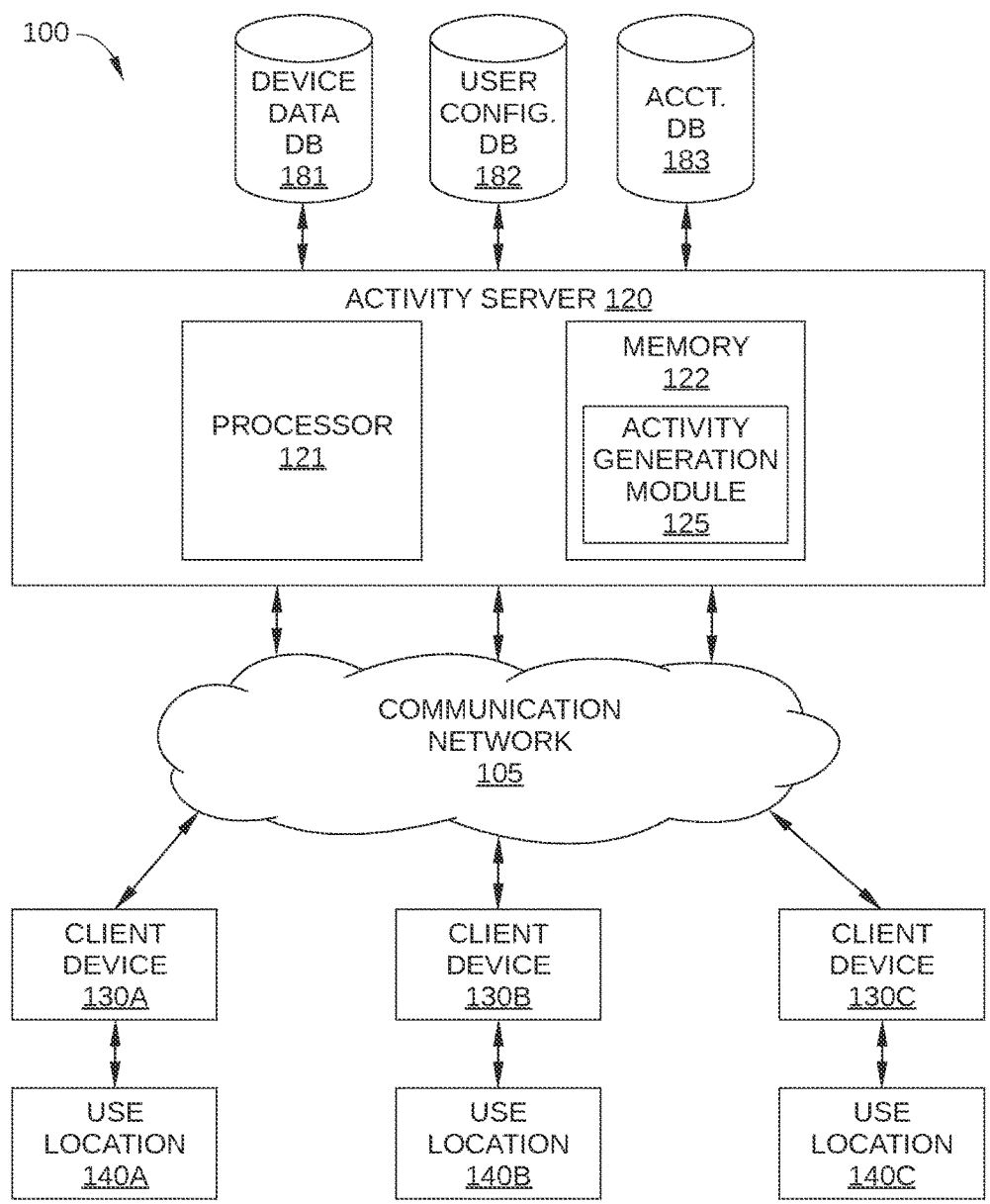
FIG. 1 illustrates a universal controller programming system configured to implement one or more aspects of the invention.

FIG. 1 illustrates a universal controller programming system 100 configured to implement one or more aspects of the invention. Universal controller programming system 100 may include, without limitation, an activity server 120 connected via a communication network 105 to one or more client devices 130A-130C, which in turn are each associated with a respective use location 140A, 140B, or 140C. For clarity, only a single client device is shown in FIG. 1 associated with each use location, but in some embodiments, multiple client devices may be associated with a single use location. Universal controller programming system 100 is configured to generate programming for universal control units or systems associated with use locations 140A-140C, and to facilitate the provision of such programming to these universal control units and systems.

The programming generated and provided by universal controller programming system 100 may include any programming sequence, configuration settings, and/or other commands or command sequences to be transmitted by a universal remote unit or universal remote system of a particular home network or use location. In some embodiments, the commands are transmitted to one or more components associated with the use location via a home network at the use location, whereas in other embodiments a non-network medium may be used to transmit such commands, for example via one-way IR commands to a TV or DVD player that cannot be networked. In some embodiments, the programming could include the sequence of wireless commands to be issued by a universal remote unit or system associated with a use location, so that a one-touch or single voice command input with the universal remote unit by a user implements a specific activity to be performed by one or more components of the use location. For instance, in such embodiments, by giving a particular voice command, or by depressing a single button or performing a single touch-screen gesture on the universal remote unit, the user can cause the appropriate devices of the home network or use location to turn on and be correctly configured for a specified activity, such as watching streaming video content, playing a video game, watching a DVD, listening to cable- or satellite-streamed music, activating or changing the settings of home control or home automation systems, etc.

Activity server 120 may be any computing device configured to implement the various embodiments of the invention described herein. Specifically, activity server 120 is configured to generate the above-described programming for client devices 130A-130C, so that each of client devices 130A-130C can operate as a universal control unit for use locations 140A-140C, respectively. In some embodiments, activity server 120 may be configured to generate such programming for a particular client device in a fully automated manner, for example based on detected components and detected connectivity of such components by the client device. In other embodiments, activity server 120 may be configured to generate provisional programming for a particular client device in an automated manner, and to modify this programming based on specific user feedback, such as when the user feedback indicates that the provisional programming does not function properly. In yet other embodiments, activity server 120 may be configured to generate provisional programming for a particular client device in a semi-automated manner, based at least in part on user-supplied information related to one or more components of the home network and on user feedback indicating whether the programming functions properly. These various embodiments are described below in conjunction with FIGS. 2-4.

In some embodiments, activity server 120 may be configured to connect to one or more of client devices 130A-130C directly via communication network 105, for example, when the client device is configured as a wireless Internet device (e.g., a smartphone, an electronic tablet, and the like). In other embodiments, activity server 120 may be configured to connect to one or more of client devices 130A-130C via communication network 105 in conjunction with the home network associated with the client device. Thus, in such embodiments, the client device is connected to the associated home network, which in turn is connected to communication network 105. For example, in such embodiments, the client device may be a wireless remote, a home automation hub, or a smartphone or tablet connected to the Internet via communication network 105, etc. Furthermore, in yet other embodiments, the functionality of activity server 120 may be incorporated into each of client devices 130A-130C.

As shown, activity server 120 may include a processor 121 and a memory 122. Processing unit 121 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 121 may be any technically feasible hardware unit capable of processing data and/or executing software applications, including activity generation module 125. Memory 110 may include a volatile memory, such as a random access memory (RAM) module, and non-volatile memory, such as a flash memory unit, a read-only memory (ROM), or any other type of memory unit or combination thereof suitable for use in activity server 120. Memory 110 is configured to store any software programs, operating system, drivers, and the like, that facilitate operation of activity server 120, including activity generation module 125. Further, in the context of this disclosure, the computing elements shown in activity server 120 may correspond to a physical computing system (e.g., a system in a data center) or may be a virtual computing instance executing within a computing cloud.

Activity generation module 125 is configured to generate programming for each of client devices 130A-130C, based on configuration data and statistical data associated with one or more electronic or electrically powered devices included in the home network or use location associated with the client device. In some embodiments, activity generation module 125 fetches such configuration data and statistical data from a device database 181 and/or a user configuration database 182, based on information received from each respective client device, as shown in FIG. 1, such as information identifying devices at a particular use location. In other embodiments, each of client devices 130A-130C may fetch such configuration data and statistical data from device database 181 and/or user configuration database 182, and activity generation module 125 may therefore receive pertinent configuration data and statistical data from each of client devices 130A-130C. Various embodiments of activity generation module 125 are described below in conjunction with FIGS. 2-4.

In some embodiments, activity server 120 may be connected to or include one or more databases, such as device database 181, user configuration database 182, and/or an account database 183. The information included in device database 181, user configuration database 182, and/or account database 183 enable activity server 120 to generate suitable and unique programming for each of client devices 130A-130C, either automatically or with limited user input or feedback.

Device database 181 may include configuration and operation data associated with each of a plurality of electronic devices that are compatible for use with one or more of use locations 140A-140C. For example, device database 181 may include the communication technology supported by a specific electronic device, such as how many and what type of input and output options are associated with the specific electronic device (e.g., USB, High-Definition Multimedia Interface (HDMI), coaxial, optical audio, WiFi, Bluetooth®, Xbee, ZigBee, Z-Wave, and the like). These inputs and outputs may be for communication with the electronic device, for providing audio and video signals to the electronic device, and/or receiving audio and video signals from the device. In addition, device database 181 may include additional operation information for each specific electronic device, such as the wireless commands, if any, associated with controlling the electronic device remotely, including infra-red (IR) or radio-frequency (RF) commands. The devices for which such information is made available in device database 181 may include digital video disk (DVD) players, compact disk (CD) players, stereo receivers, audio-video receivers (AVRs), digital video recording (DVRs), set-top cable control boxes, display devices, such as computer monitors, smart TVs, or passive TVs, environmental control systems, remote-controlled lights, window shades, and door locks, and the like.

In addition, in some embodiments, device database 181 may include, for some or all electronic devices referenced therein, a set of device functionality attributes. The set of device functionality attributes defines the control functions that can be performed by the device, i.e., the device capabilities, and a priority associated with each such device capability, i.e., the device capability priority. Examples of device capabilities include input switching, entering text (for example, based on a user input via a particular input device), IP (Internet protocol) communication and control, Bluetooth communication and control, USB communication and control, controlling volume, changing channel, displaying video, outputting audio, dimming lights, other control functions, and the like.

In some embodiments, for each device capability associated with a particular electronic device in device database 181, a device capability priority that corresponds to that device capability is stored. Each device capability priority defines how well-suited the associated electronic device is for performing the corresponding device capability, for example via a value on a relative scale. Thus, each electronic device referenced in device database 181 and capable of a particular function may be compared in suitability for performing that particular function to other electronic devices that are also referenced in device database 181 as being capable of that particular function.

For instance, while a conventional passive TV may have the device capability to provide audio output via built-in loudspeakers, a 5.1 digital audio system is more suitable for providing audio output, and therefore would have a significantly higher device capability priority corresponding thereto. Similarly, multiple electronic devices in a particular home network may have the capability to control the volume of audio output, such as the TV being watched, the AVR that is routing the video signal to the TV, and the cable box that is the source device of the audio and video signals. Based on granularity of control, response time, ease of use, robustness of communication protocol, or simply user preference, one of these electronic devices generally is preferred for the volume control device capability, and consequently has a significantly higher device capability priority relative to the other electronic devices.

In some embodiments, the device capability priority for a particular device capability may be a numeric or alphanumeric value. Furthermore, in some embodiment, the device capability priority for a particular device capability may be a subjectively determined value, for example based on a survey of users and/or manufacturer personnel. Alternatively or additionally, the device capability priority for a particular device capability may be based on one or more quantitative factors. For example, for the device capability of displaying video, the device capability priority may be based on size and/or resolution of a screen associated with the electronic device in question. In such embodiments, the device capability priority may be determined for a particular electronic device and device capability by any suitable algorithm. Because each electronic device in a particular home network or use location can therefore be ranked in priority of use for a particular device capability, activity server 120 can accurately select the most suitable electronic device for each role in a particular activity.

User configuration database 182 may include statistical use data associated with each of a plurality of electronic devices that may be included one or more of use locations 140A-140C or are compatible for use with a home network associated with one or more of use locations 140A-140C. Specifically, user configuration database 182 may include statistical data or other aggregated data indicating the likelihood of a particular configuration of one or more electronic devices in a use location being used for a given activity. For example, user configuration database 182 may indicate that, in home entertainment systems that include a particular model or brand of smart TV, a particular AVR with a dedicated game input, and a video game console, the home entertainment system is most frequently configured with the video game console connected to the AVR via the game input rather than to the smart TV directly. Consequently, activity server 120 may generate programming for the universal control unit associated with such a home entertainment system based on such statistical information. Thus, for activities that employ the smart TV, the AVR, or the video game, activity server 120 may assume that the video game is connected to the AVR via the game input, and the smart TV is connected to the AVR via one of the remaining inputs.

In some embodiments, the aggregated data in configuration database 182 may also indicate the most likely method used for connecting this particular brand or model of smart TV to this particular AVR (e.g., HDMI cable, WiFi network, etc.), thereby providing additional information to activity server 120 regarding the most likely connectivity employed between the smart TV and the AVR. In this way, when generating programming to be employed by a universal control system associated with a particular use location, activity server 120 can assume a configuration of that particular use location for a particular activity that is likely to be correct.

In some embodiments, the statistical use data and aggregated data available in configuration database 182 may be collected via user or manufacturer surveys. Alternatively or additionally, such data may be collected in an automated fashion by client devices 130A-130C, thereby providing highly accurate information regarding the most commonly employed configurations of the many possible combinations of electronic devices available to consumers. Furthermore, in some embodiments, the statistical and aggregated data available in configuration database 182 may be further broken down by location of a particular use location (country, region, state), manufacturer of each particular electronic device, demographic information associated with a user or users of each particular use location (age, gender, language spoken, and the like), and so on. Thus, in some embodiments, activity server 120 may be configured to generate different programming for a universal control system depending on the above-described demographic factors, and not just on likely hardware and connectivity configurations associated with a particular activity and combination of electronic devices.

Account database 183 may include information specific to each of use locations 140A-140C, such as what devices are included in each use location and how such devices are connected to each other. Thus, in some embodiments, each of use locations 140A-140C may have an account and a corresponding portion of account database 183 associated therewith. The account may include, for example a list of devices associated with a specific use location. In some embodiments, the list of devices includes devices that are known to be currently installed in the use location. In other embodiments, the list of devices may include devices that have not yet been installed in the use location, but are in some way associated with the use location. For example, the account for a particular use location may be configured to receive purchasing information from a particular retailer or manufacturer when a user associated with the account purchases a device that is compatible for use with the use location. In such embodiments, electronically received purchasing information received in account database 183 may be used as triggering information for activity generation module 125, as described below in conjunction with FIGS. 5 and 6.

Communication network 105 may be any technically feasible type of communications network that allows data to be exchanged between activity server 120 and client devices 130A-130C. For example, network 105 may include a wide area network (WAN) and/or the Internet, among others.

Each of client devices 130A-130C may be any technically feasible computing device configured to receive programming from activity server 120 and implement such programming as a universal control system, when requested by a user. Examples of computing devices suitable for use as one or more of client devices 130A-130C include a universal remote unit, a smartphone, an electronic tablet, a voice enabled network device, and a wireless hub, among others. Typically, such a universal control system is configured to communicate with some or all electronic devices in a use location, for example via IR- or RF-based protocols (such as Bluetooth®, WiFi, and the like). Alternatively or additionally, such a universal control system may be configured to communicate with some or all of the electronic devices in a use location via wired connections, such as USB- or HDMI-based connections. Similarly, smartphones and electronic tablets, when operating as a universal control system for a use location, may be configured with a suitable application that enables communication with electronic devices in the use location via an RF-based protocol. It is noted that each of client devices 130A-130C may be configured to communicate with multiple electronic device associated with a use location, but not necessarily each and every electronic device associated with the use location.

Each of use locations 140A-140C includes a set of devices, and may also include any technically feasible wired or wireless LAN, such as a residential or small commercial communication network. In addition, each of use locations 140A-140C may also include one or more home automation controllers or home automation devices, one or more home entertainment systems, and the like. One embodiment of a use location is illustrated in FIG. 2, as described below.

Figure 2:
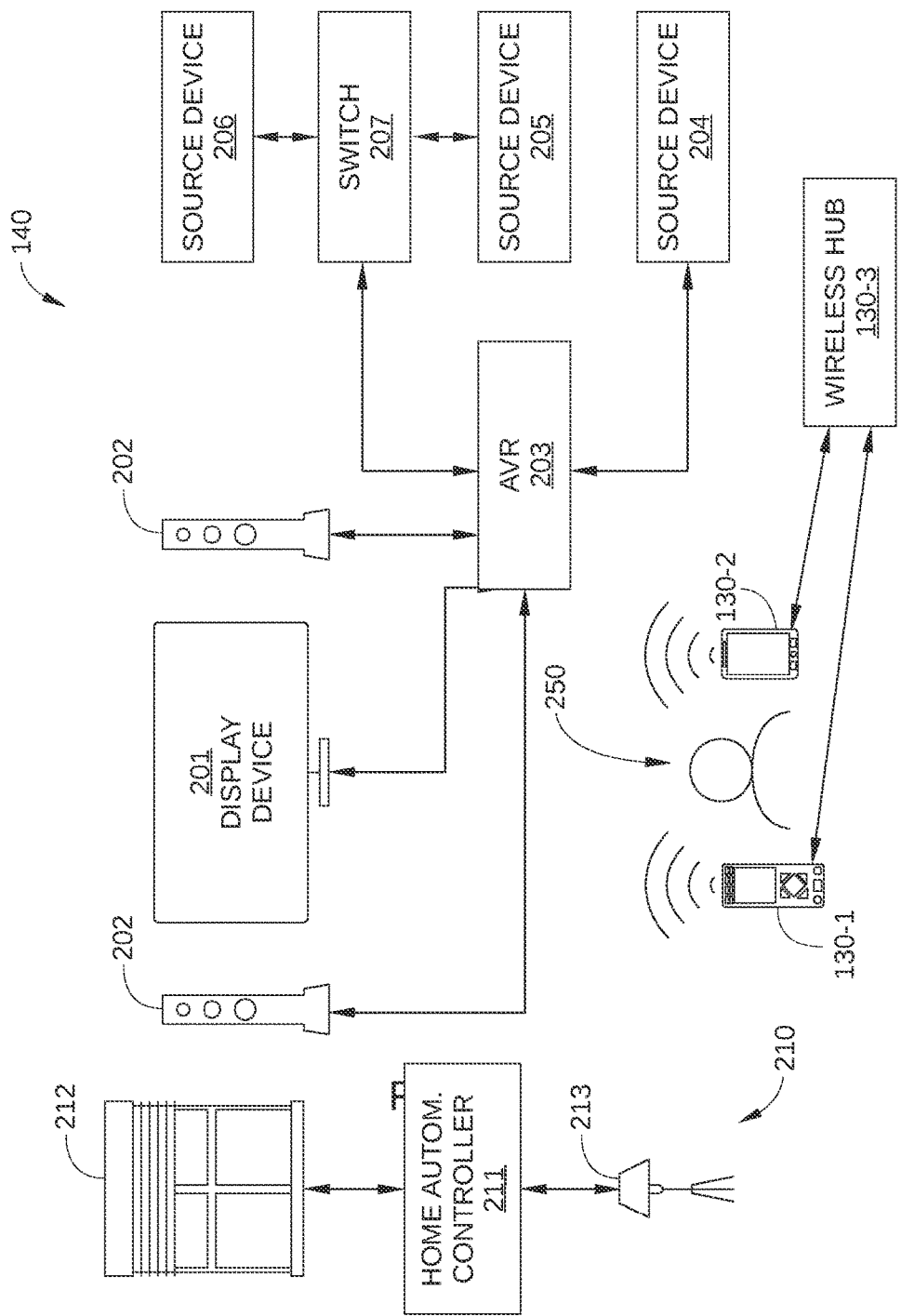
FIG. 2 is a schematic diagram illustrating a home network configured to implement one or more aspects of the invention.

FIG. 2 is a schematic diagram illustrating a use location 140 configured to implement one or more aspects of the invention. As shown, use location 140 may include, without limitation, one or more of a home automation system 210, a display device 201, loudspeakers 202, an AVR 203, source devices 204-206, a switch 207 connecting source devices 205 and 206 to AVR 203, and in some embodiments, a wireless hub 209. Also shown are a user 250 and three client devices 130-1, 130-2, and 130-3. In the embodiment illustrated in FIG. 2, client device 130-1 is depicted as a universal remote unit, client device 130-2 is depicted as a smartphone enabled to communicate with some or all components of use location 140 with a suitable communication application, and client device 130-3 is depicted as a wireless hub. In embodiments in which the universal control system of use location 140 is a wireless hub, client device 130-3 may be configured to communicate with some or all components of use location 140 via one or more external devices, such as a universal remote unit or a suitably programmed smartphone. Thus, in such embodiments, user 250 may interface with client device 130-3 via such an external device. For simplicity, the term client device 130 is used herein to refer to client device 130-1, client device 130-2, client device 130-3, or any combination thereof.

Display device 201 may be any display device suitable for use in a use location or home entertainment system, including a smart TV, a passive TV, a computer monitor, a video projector, and the like. In the embodiment illustrated in FIG. 2, display device 201 receives input from AVR 203, but in other embodiments, may receive multiple inputs directly from one or more source devices, such as a video game console, DVD player, set-top cable box, etc. In addition, display device 201 may be connected to such source devices and/or to AVR 203 via a wired connection (such as and HDMI cable), a wireless connection (such as WiFi or Bluetooth®), or a combination of both. Thus, connectivity between display device 201 and the appropriate source device may depend on the particular activity requested by a user. Without properly functioning programming of client device 130, one-touch selection of an activity is generally not enabled, and a user must manually configure the necessary connectivity between display device 201 and the appropriate source device for each different activity. This process can be frustrating and often cannot be accomplished by an inexperienced user.

Loudspeakers 202 may include any audio system suitable for use in a home network or home entertainment system, including one or more mono speakers, a stereo speaker system, a multi-channel (surround sound) speaker system, and the like. In some embodiments, loudspeakers 202 may include a wireless speaker system configured to receive wireless control commands, for example from client device 130, and wireless audio input, for example from AVR 203 or directly from one of source devices 204-206. In the embodiment illustrated in FIG. 2, loudspeakers 202 receive input from AVR 203, but in other embodiments, may receive multiple inputs directly from one or more source devices, via wired or wireless connections. Thus, as noted above for display device 201, connectivity between loudspeakers 202 and a source device for an activity may vary depending on what activity is requested by a user. Whenever an activity is requested by a user, properly functioning programming of client device 130 can automatically implement the correct connectivity for the requested activity, thereby obviating the need for any sort of manual setup of the connectivity to loudspeakers 202.

AVR 203 may include any audio-video receiver suitable for use in a home network or home entertainment system, a stereo receiver, or any other device configured to receive audio and/or video signals from one or more of source devices 204-206 and to process these signals to drive loudspeakers 202 and display device 201. By way of example, in the embodiment illustrated in FIG. 2, AVR 203 is configured to selectively connect the output of either source device 204 or switch 207 to display device 201 and loudspeakers 202, but any other technically feasible connectivity between AVR 203 and various components of home network 240 are also contemplated. Generally, for each activity selected by a user, a different connectivity between AVR 203 and other components of home network 240 may be necessary, i.e., the active input of AVR 203 may change. Furthermore, volume, sound equalization, and other settings of AVR 203 may also change, depending on the specific activity selected by the user. Properly functioning programming of client device 130 can automatically implement the correct configuration of AVR 203 for the requested activity, thereby obviating the need for any sort of manual setup by the user.

Each of source devices 204-206 may be any device that provides audio or audio-video content to a home entertainment system, such as a satellite receiver, a radio, a DVD player, a Blu-ray Disc players, a VCR, a video game console, a set-top cable TV box, and the like. Typically, a different source device may be associated with each activity selected by a user. For example, in a "watch cable TV" activity, the source device could be a set-top cable box, since that is the source of the audio and video signals. In additional examples, the source device for a "play game" activity could be a video game console, the source device for a "watch movie" activity could be a DVD player, Blu-ray player, or streaming media player, the source device for a "listen to music" activity could be a music system or WiFi-connected speaker system, and the source device for a "listen to radio" activity could be a stereo receiver. Properly functioning programming of client device 130 can automatically select the appropriate source device for each activity selected by the user.

Switch 207 may be any device that acts as a pass-through device for audio and/or audio/video signals, but expands the number of available input ports in a home entertainment system and typically provides selective switching between the multiple media inputs. For example, in some embodiments, switch 207 may be an HDMI switch. Thus, switch 207 enables more source devices to be connected to an electronic device, such as AVR 203 or display device 201, for example via HDMI cable. For an activity that includes a source device connected to switch 207, switch 207 must be configured to selectively connect that source device to the appropriate receiving device (e.g., AVR 203, display device 201, loudspeakers 202, etc.), otherwise use location 140 will not be configured correctly for the devices associated with the activity to function properly. Properly functioning programming of client device 130 can automatically select the appropriate switch setting for each activity selected by the user.

Wireless hub 209 may be any technically feasible wireless router or other device configured to receive commands from client device 130 and to relay such wireless commands to one or more components of use location 140. For example, wireless hub 209 may be configured to communicate using IR, Wi-Fi, or Bluetooth® wireless signals. Alternatively or additionally, wireless hub 209 may include the functionality of a conventional wireless router. In such embodiments, the wireless LAN (WLAN) associated with wireless hub 209 may be used for IP control of and communication with one or more of the components of use location 140. Thus, in such embodiments, one or more of display device 201, loudspeakers 202, AVR 203, source devices 204-206, and home automation system 210 may be connected to the above-described WLAN in addition to or in lieu of the connections illustrated in FIG. 2.

Home automation system 210 may be any system configured for centralized control of lighting, environmental systems, appliances, door locks, and/or other systems. For example, home automation system 210 may include a home automation controller 211, one or more powered blinds 212, and one or more controlled lighting fixtures, among other things. In embodiments in which use location 140 includes home automation system 210, client device 130 may be configured to communicate with home automation system 210 and/or the components thereof via an appropriate wireless communication protocol, such as Zigbee, Z-Wave, and the like. Thus, settings for one or more components of home automation system 210 may be included in the definition of an activity. For example, for a "watch TV during the day" activity, in addition to sending commands to display device 201 and the appropriate source device to power up, and to AVR 203 to connect the source device to display device 201 and loudspeakers 202, client device 130 may also be programmed to send commands that cause powered blinds 212 to close. The command causing powered blinds 212 to close may be sent directly to powered blinds 212, or to home automation controller 211, depending on the configuration of home automation system 210.

In operation, user 201 can utilize client device 130 to correctly configure one or more components of use location 140 for a specified activity based on a single input on an HID associated with the client device 130, such as when a user depresses a specific button or performs a single touch-screen gesture on a touch screen. For example, for the activity "watching streaming video content," the programming generated and provided by universal controller programming system 100 could include commands suitable for powering on a predetermined display device (such as display device 201), configuring AVR 203 to select an HDMI output corresponding to the predetermined display device, setting switch 207 to pass through signals from a streaming media player (for example, source device 206), and powering on the streaming media player. In addition, the above-described programming could include appropriate delays between specific commands, so that when a device is powered on, such as the streaming media player, the device can be prepared to receive subsequent commands. Thus, in response to a single input, such as a screen tap mapped to the "watch streaming video content" activity, use location 140 can be configured for the selected activity.

As set forth above, when correctly programmed, client device 130 enables implementation of voice command or one-touch, activity-based control of use location 140. However, as previously described herein, the process of correctly programming client device 130, when performed by a typical end-user, can be an involved, time-consuming, and frustrating process. By contrast, according to embodiments of the invention, universal controller programming system 100 is configured to generate programming for client device 130 either in a fully automated manner or based, in part, on user-supplied information related to one or more components of use location 140. In the latter case, universal controller programming system 100 may also modify the programming for one or more activities based on user feedback indicating whether the modified programming functions properly.

In some embodiments, activity generation module 125 is configured to generate programming for client device 130 in a fully automated manner, i.e., without user input. In such embodiments, activity generation module 125 in FIG. 1 is configured to receive information from client device 130 indicating the various components included in use location 140, generate a list of devices associated with use location 140, and generate programming for an activity to be performed via a first set of devices in the list of devices. The programming for the activity includes one or more commands for the first set of devices that, when transmitted by client device 130, implement a configuration of the first set of devices that enables the activity to be performed by use location 140. In such embodiments, activity generation module 125 generates the programming for the activity based on configuration data and statistical data associated with one or more devices included in the list of devices, such as data stored in device database 181 and user configuration database 182 (shown in FIG. 1).

Activity generation module 125 may also generate programming for additional activities, where each additional activity can be performed via a different set of devices in the list of devices. In some embodiments, activity generation module 125 may determine the additional activities for which to generate programming based on configuration data and statistical data associated with one or more devices included in the list of devices, such as data stored in device database 181 and user configuration database 182. For example, data stored in user configuration database 182 may indicate that for the combination of devices currently included in use location 140, one or more activities are usually programmed.

As described above, activity generation module 125 generates programming for one or more activities to be performed by use location 140. For each such activity, activity generation module 125 may employ any suitable algorithm to determine what device configuration is selected for the programming of client device 130. For example, in some embodiments, activity generation module 125 may generate a list of devices included in use location 140, then generate a list of suitable activities based on the list of devices and on data stored in user configuration database 182, where specific activities may be supported by specific devices. Alternatively or additionally, activity generation module 125 may generate a list of suitable activities based on devices referenced in user account information stored in account database 183. Then, for each activity on the list of suitable activities, activity generation module 125 determines a provisional device configuration most likely to coincide with what is present in use location 140, and generates programming for client device 130 that implements the provisional device configuration when the activity is selected.

Activity generation module 125 may determine the provisional device configuration for a particular activity based on multiple factors, including the mandatory activity roles associated with the particular activity, optional activity roles associated with the particular activity, the capabilities of each device in use location 140 and/or associated with the user account for use location 140, and the capability priority of each such device for each device capability that corresponds to a mandatory or optional activity role associated with the particular activity. Mandatory activity roles for a particular activity include device capabilities necessary for the activity to occur. For example, for a Watch TV activity, mandatory activity roles include a device capable of displaying video, a device capable of controlling sound volume, and a device capable of changing channels. Optional activity roles associated with a particular activity include device capabilities that may be employed in conjunction with the activity, but are not necessary for the activity to take place. For example, for a Watch TV activity, optional activity roles include a device capable of enabling text entry and a device capable of running Google TV.

In some embodiments, when multiple devices in use location 140 are capable of performing a mandatory activity role, activity generation module 125 can determine which device to include in the provisional configuration for the activity based on the device capability priority for each respective device. Furthermore, in the case of connectivity, activity generation module 125 can determine a particular connectivity between the devices associated with the activity based on data stored in device database 181 and/or user configuration database 182, since these data generally indicate what connectivity is available for a particular device, and what connectivity is most commonly employed for a particular combination of devices. In light of the above, programming for client device 130 can be generated that enables a user to select one or more activities to be performed at use location 140 with client device 130 with substantially little or no input from a user. Please note that, in such embodiments, the activities for which programming is generated are associated with devices in use location 140 that are configured to provide identifying information to client device 130, such as Wi-Fi enabled or IP-enabled electronic devices. Furthermore, in some embodiments, client device 130 may also be configured to receive feedback from one or more of the devices included in use location 140, where the feedback indicates that the device or devices are functioning correctly when an activity selected by the user includes these devices. Consequently, in such embodiments, client device 130 receives confirmation that the programming for a particular activity functions correctly without user feedback. When a user selects an activity, and the feedback from one or more devices associated with the activity indicates that the device or devices are not functioning correctly, client device 130 is configured to transmit such feedback to activity server 120, and activity generation module 125 modifies the programming associated with activity accordingly. For example, a different connectivity configuration of one or more devices associated with the activity may be implemented.

In some embodiments, the feedback received by client device 130 from a device associated with a particular activity may include a communication signal indicating that the device is operating correctly and/or is receiving an expected signal. For example, such a communication signal may be received by client device 130 or wireless hub 209 from electronic devices configured to communicate via an IP control signal, a Wi-Fi signal, and/or a Bluetooth® signal. In embodiments in which wireless hub 209 includes an HDMI connection to one or more devices in use location 140, client device 130 may receive the communication signal via the HDMI consumer electronics control (CEO) communications protocol from suitably configured devices.

In some embodiments, the feedback received by client device 130 from a device associated with a particular activity may include an optical and/or sonic trigger generated by the device. For example, when programming for a particular activity is implemented for the first time, client device 130 may cause such an optical or sonic trigger to be generated by the device associated with the activity, to determine whether the device and all connectivity to the device is configured correctly. Thus, in the case of an audio output device, such as loudspeakers 202, confirmation that the audio output device and connectivity thereto is functioning correctly is received when the client device 130 detects the sonic trigger, for example with a microphone incorporated into client device 130. In the case of a video output device, such as display device 201, confirmation that the video output device and connectivity thereto is functioning correctly is received when the client device 130 detects the optical trigger, for example with a camera included in client device 130.

In some embodiments, universal controller programming system 100 is configured to generate programming for client device 130 based at least in part on user-supplied information related to one or more components of the home network. In such embodiments, a so-called "progressive programming" procedure may be employed, one embodiment of which is illustrated in FIG. 3.

Figure 3:
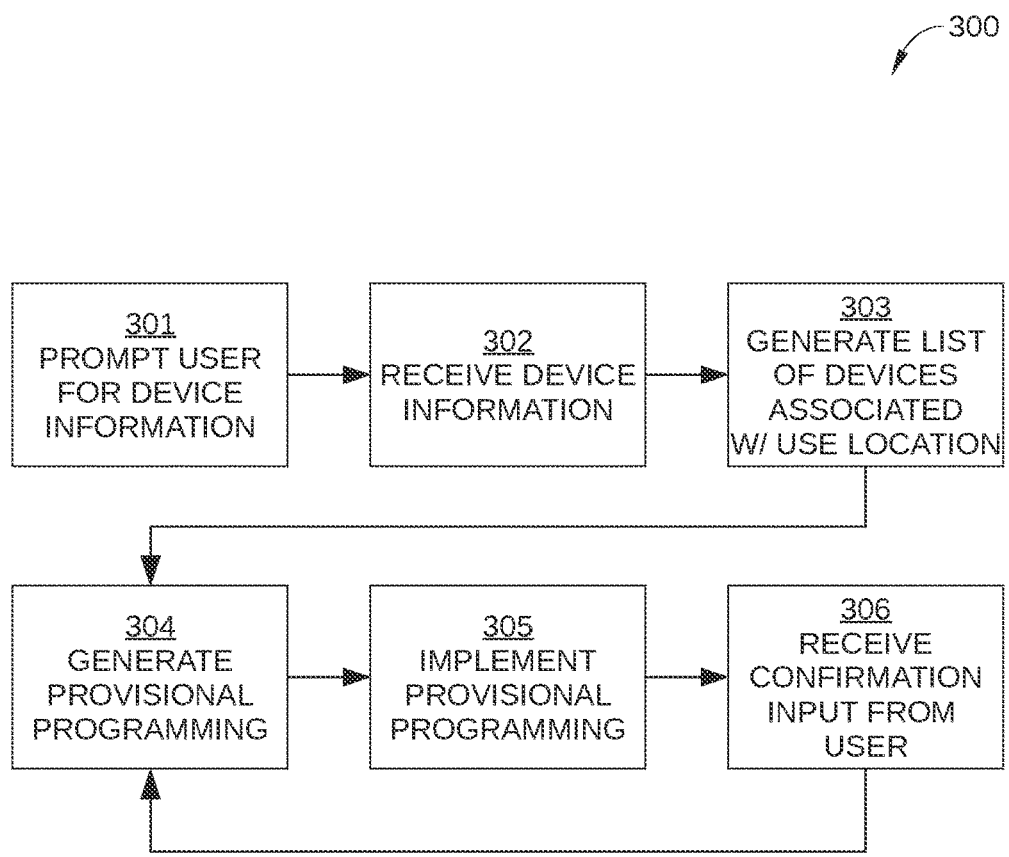
FIG. 3 is a conceptual block diagram of a progressive programming procedure, according to various embodiments of the invention.

FIG. 3 is a conceptual block diagram of a progressive programming procedure 300, according to various embodiments of the invention. In block 301 of progressive programming procedure 300, a user is prompted, either by activity generation module 125 or an application running locally on client device 130, to provide specific information indicating what devices are included in use location 140. In block 302, the user-provided information is transmitted to activity server 120, for example by client device 130, and is received by activity generation module 125. In block 303, based on the received information, activity generation module 125 generates a list of devices associated with use location 140. In block 304, based on the received information, as well as on data stored in device database 181 and configuration database 182, activity generation module 125 generates provisional programming for one or more activities to be performed by the identified devices. In addition, activity generation module 125 implements the provisional programming in client device 130. In block 305, an activity is selected by a user of use location 140 for the first time, the provisional programming for the selected activity is implemented, and the user is prompted for feedback indicating whether the provisional programming for that activity functions properly. In block 306, the user confirmation input, i.e., user feedback indicating whether the selected activity functions properly, is received and fed back to activity generation module 125, which can then generate modified programming for the activity accordingly.

The progressive programming procedure described above includes prompting a user for specific information related to use location 140 and to the proper functioning of the provisional programming for a new activity. In some embodiments, a graphical user interface (GUI) may be displayed on a touch-screen of client device 130 to prompt a user for such information. One embodiment of such a touch-screen GUI is illustrated in FIGS. 4A-4E.

Figure 4C:
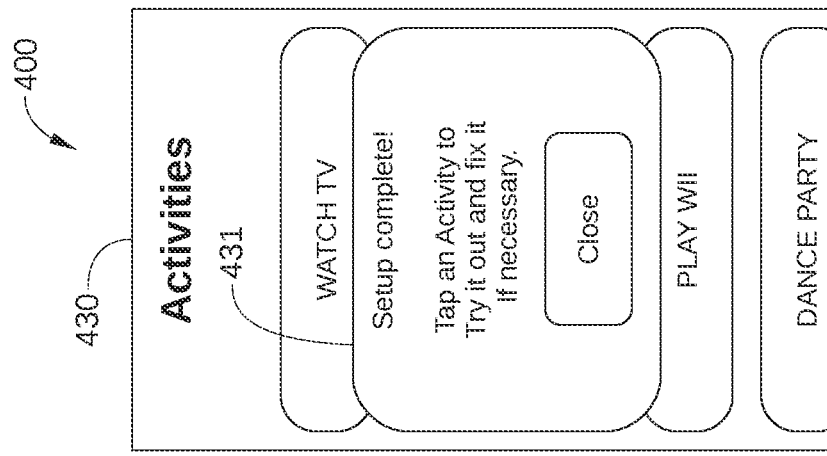
FIGS. 4A-4E illustrate various pages of a graphical user interface (GUI) implemented on a client device and configured to implement one or more aspects of the invention.
Figure 4B:
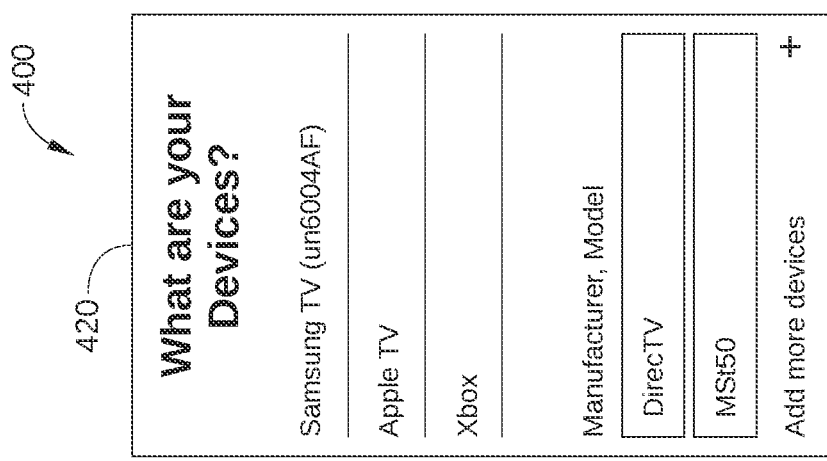
Figure 4A:
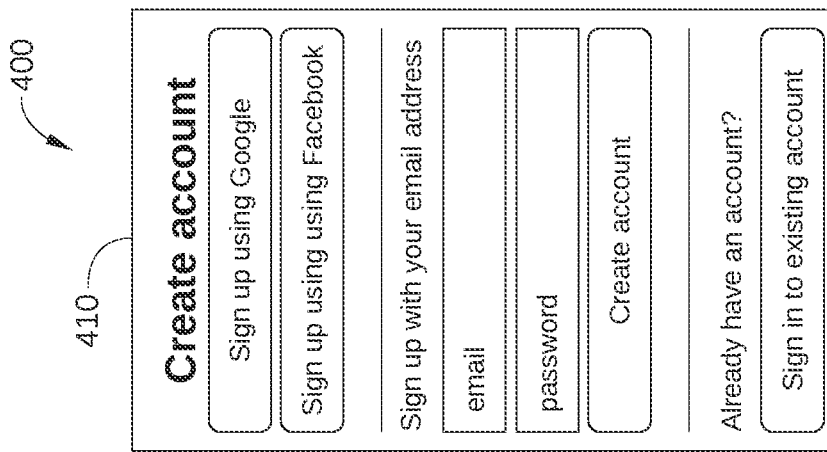

FIGS. 4A-4E illustrate various pages of a graphical user interface (GUI) 400 implemented on a client device and configured to implement one or more aspects of the invention. Client device GUI 400 is a GUI that is configured for display by client device 130 in FIG. 2 and for receiving input from a user, for example via a touch-screen of client device 130. FIG. 4A illustrates a sign-in page 410 that prompts a user of use location 140 to either sign in to an existing account associated with use location 140 or to create a new account. As noted, information associated with such an account may be stored in account database 183, which is shown in FIG. 1. Once signed in to the account associated with use location 140, information obtained by client device 130 via client device GUI 400 may be stored in that account.

FIG. 4B illustrates a device entry page 420 that prompts a user to enter information associated with the devices included in use location 140, such as source devices, display devices, audio devices, and the like. In addition, device entry page 420 may display some or all of the devices currently included in use location 140 and the account associated therewith. In some embodiments, client device 130 is configured to transmit information entered by a user to activity server 120, for example when the user closes device entry page 420 or selects the "Add more devices" function. Upon transmission of such information, activity server 120 may begin the process of generating programming for one or more activities to be performed by use location 140.

Figures 4D, 4E:
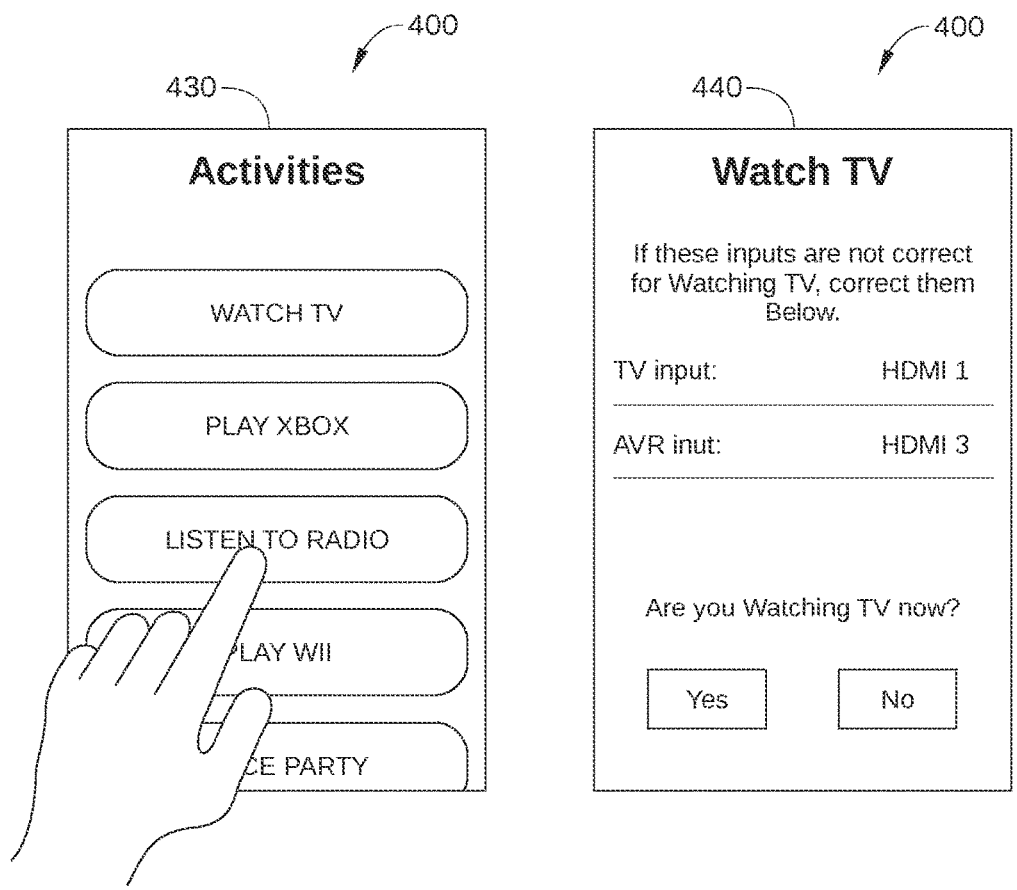

FIG. 4C illustrates an activity page 430 that is displayed after a user closes device entry page 420 and activity server 120 has completed generation of programming for one or more activities. A dialog box 431 is displayed superimposed on activity page 430 prompting the user to select an activity to verify that the programming for that activity functions properly. FIG. 4D illustrates activity page 430 after the user has closed dialog box 421 and is preparing to select an activity. It is noted that the activities displayed may be those generated by activity generation module 125 or input by the user, and may be based on the device information entered via device entry page 420 and/or on data stored in device database 181 and user configuration database 182.

FIG. 4E illustrates an activity confirmation page 440 that is displayed after the user selects an activity on activity page 430. Activity confirmation page 440 is displayed in embodiments in which automated feedback is not available for all devices associated with the selected activity. For example, when the selected activity includes one or more IR-controlled devices, or any other devices that are not configured to provide operational information to client device 130 via RF communications, IP scanning, or HDMI CEO, user feedback may be solicited via activity confirmation page 440. Thus, once an activity is selected via activity page 430 and client device 130 issues the commands programmed for that specific activity, a user may enter an appropriate input indicating whether the devices associated with the activity are functioning correctly.

In some embodiments, activity confirmation page 440 may include additional inputs that allow a more knowledgeable user to troubleshoot or modify the configuration programmed into client device 130 for the selected activity. For example, inputs may be displayed on activity confirmation page 440 for changing connectivity between some devices. In other embodiments, the user input on activity confirmation may be limited to a simple 'Yes' or 'No'. In such embodiments, a 'No' input causes activity generation module 125 to modify the programming for the activity based on the user input, and transmit the modified programming to client device 130. Client device 130 again issues the commands programmed for that specific activity, and once again displays activity page 430 on client device 130. This process may be repeated until the user indicates that the devices associated with the selected activity function properly. For example, modifications made to the programming for the selected activity may include using the next most likely connectivity configuration between one or more devices, as indicated by data stored in user configuration database 182.

Figure 5:
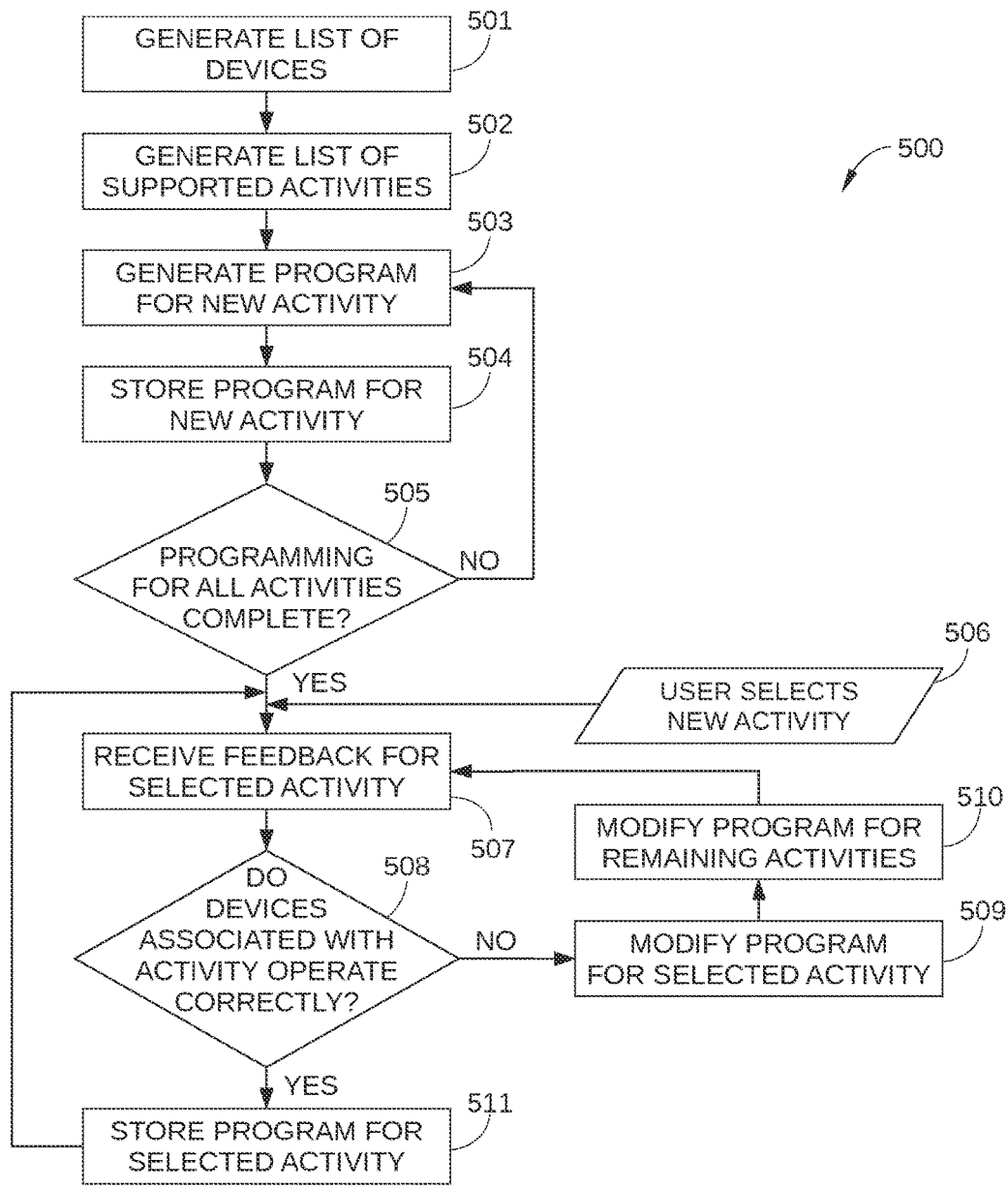
FIG. 5 is a flowchart of method steps for generating a program for a universal control system, according to various embodiments of the invention.

FIG. 5 is a flowchart of method steps for generating a program for a universal control system, according to various embodiments of the present invention. Although the method steps are described in conjunction with the systems of FIGS. 1-4E, persons skilled in the art will understand that any system configured to perform the method steps, in any order, is within the scope of the present invention.

As shown, a method 500 begins at step 501, where activity generation module 125 generates a list of devices associated with use location 140. In some embodiments, activity generation module 125 generates the list of devices in response to receiving device information from client device 130, either directly via communication network 105 or via use location 140. Thus, in embodiments in which activity generation module 125 is configured to generate programming for a particular client device 130 in a fully automated manner, client device 130 may be configured to automatically transmit such device information. For example, upon initial startup or modification of use location 140, client device 130 may detect new devices added to use location 140, e.g., via Bluetooth, Zibgee, etc., and transmit device information to activity generation module 125 in response thereto. Alternatively or additionally, client device 130 may receive a setup command from a user or an input from the user indicating that a new device has been added to use location 140. In embodiments in which activity generation module 125 is configured to generate programming for a particular client device 130 based on user feedback, such as a progressive programming procedure, the user may enter some or all of the device information received by activity generation module 125 in step 501.

In other embodiments, activity generation module 125 generates the list of devices in response to receiving triggering information for an account associated with use location 140. For example, in such embodiments, whenever entries are added or modified for an account in account database 183 and associated with use location 140, activity generation module 125 may generate a list of devices associated with use location 140. In such embodiments, the list of devices generated may include devices that are referenced in the account associated with use location 140 and determined to be compatible for use with use location 140. Thus, an electronic receipt, e-mail, or other electronic notification that a user associated with use location 140 has purchased a device compatible for use with use location 140 may cause activity generation module 125 to perform step 501.

In step 502, activity generation module 125 generates a list of supported activities to be performed by use location 140. For example, in some embodiments, activity generation module 125 generates the list of supported activities by determining the device capabilities for each device in the list of devices generated in step 501. In such embodiments, activity generation module 125 may determine such capabilities based on data included in device database 181. Thus, despite the thousands of devices available for use with use location 140, activity generation module 125 can determine the capabilities of whatever devices are included in or added to use location 140, and the activities supported by these devices.

In step 503, activity generation module 125 generates the programming for one of the activities in the list of supported activities generated in step 502. In some embodiments, activity generating module generates the programming based on configuration data and statistical data associated with one or more devices included in the list of devices. Such data are available in device database 181 and user configuration database 182. As noted, the programming may include any programming sequences, configuration settings, and/or other commands to be transmitted by client device 130. In addition, the programming for the activity of interest is configured so that, when the associated activity is selected, a device configuration for the devices associated with the activity is implemented in use location 140.

In step 504, activity generation module 125 then causes the generated programming to be stored, either by transmitting the programming to use location 140 for storage, or storing the programming remotely from use location 140, for example in a server located remotely from use location 140. When stored locally in use location 140, the programming may be stored in client device 130, wireless hub 209, or any other suitable device included in use location 140. When stored remotely from use location 140, the programming may be stored in account database 183.

In step 505, activity generation module 125 determines whether programming is complete for all activities in the list of supported activities generated in step 502. If yes, method 500 proceeds to step 505; if no, method 500 proceeds back to step 503.

In step 506, a user selects an activity that has not yet been performed by use location 140, for example by performing an input gesture on client device 130. In some embodiments, client device 130 may be configured to cause a query to be displayed or otherwise issued to a user suggesting that the user initiate a newly programmed activity, as shown on activity page 430 in FIG. 4C. Thus, in such embodiments, the user may select the activity in response to such a prompt.

In step 507, activity generation module 125 receives feedback for the activity selected in step 506. Specifically, the feedback received in step 507 indicates whether the programming for the selected activity has resulted in correct operation of the devices associated with the selected activity. In embodiments in which activity generation module 125 is configured to generate programming for a particular client device 130 based on user feedback, the user may enter some or all of the feedback received by activity generation module 125, for example via device entry page 420 in FIG. 4B. In embodiments in which activity generation module 125 is configured to generate programming for a particular client device 130 in a fully automated manner, client device 130 may be configured to automatically transmit such feedback to activity generation module 125.

In step 508, activity generation module 125 determines whether the devices associated with the selected activity operate correctly. If no, method 500 proceeds to step 509; if yes, method 500 proceeds to step 511.

In step 509, activity generation module 125 modifies the selected activity, since the feedback received in step 507 indicates that some or all devices associated with the selected activity do not operate correctly. In some embodiments, the modification to the programming may be based on data stored in device database 181 and/or user configuration database 182.

In step 510, activity generation module 125 modifies the programming for some or all remaining activities associated with use location 140 for which activity generation module 125 has generated programming. For example, programming for activities that include one or more of the same devices as the activity for which programming is modified in step 509 may also be modified. Thus, based on the feedback received in step 507, activity generation module 125 can improve the programming for other activities besides the activity selected in step 506.

In step 511, activity generation module 125 stores the programming for the selected activity and/or the device configuration associated with such programming in user configuration database 182. Thus, when a device configuration for an activity associated with use location 140 is verified to function correctly, the device configuration is added to user configuration database 182, thereby updating and improving the information stored in configuration database 182.

In some embodiments, activity generation module 125 may be configured to generate programming for an activity that is supported by a device that has not yet been incorporated into use location 140. One such embodiment is described below in conjunction with FIG. 6.

Figure 6:
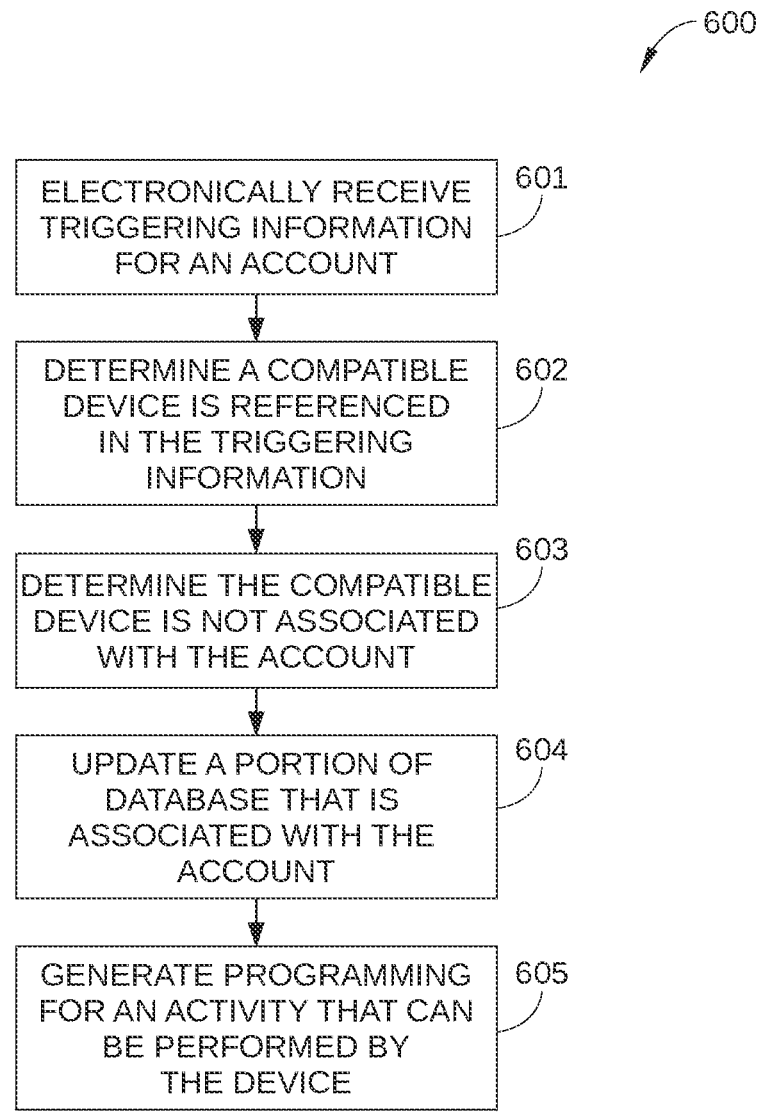
FIG. 6 is a flowchart of method steps for modifying account information associated with a universal control system, according to various embodiments of the present invention.

FIG. 6 is a flowchart of method steps for modifying account information associated with a universal control system, according to various embodiments of the present invention. Although the method steps are described in conjunction with the systems of FIGS. 1-4E, persons skilled in the art will understand that any system configured to perform the method steps, in any order, is within the scope of the present invention.

As shown, a method 600 begins at step 601, where activity generation module 125 electronically receives triggering information for an account associated with use location 140. For example, the account may be associated with a portion of account database 183, the portion including a list of devices associated with use location 140. In some embodiments, the list of devices includes devices that are known to be currently installed in use location 140. In other embodiments, the list of devices may include devices that have not yet been installed in the home network, but are in some way associated with the home network, for example via a purchase history.

In some embodiments, the triggering information received in step 601 may include information from an entity from which a device compatible for use with use location 140 has been purchased. In other embodiments, receiving the triggering information may include searching a purchase history associated with the account associated with use location 140. In some embodiments, activity generation module 125 may search the purchase history in response to receiving a setup command via an HID device associated with use location 140, for example client device 130. In some embodiments, activity generation module 125 may generate or modify the purchasing history in response to one or more electronic communications to a user associated with the account, such as an e-mail, an electronic receipt, an electronic warranty agreement, and the like. In such embodiments, a purchase history associated with the account can be updated when such electronic communications are received.

In some embodiments, the purchasing history may be stored in account database 183. Alternatively or additionally, the purchasing history may be stored in multiple locations. For example, a portion of the purchasing history for the account may include purchases from a first retailer and may reside in a server or other computing device associated with the first retailer, while and another portion of the purchasing history for the account may include purchases from a second retailer and may reside in a server or other computing device associated with the second retailer. In such embodiments, the account in database 183 may be linked in some way to corresponding accounts with the first and second retailer to enable searching of purchase history that is not stored in database 183.

In step 602, activity generation module 125 determines that a device that is compatible for use with use location 140 is referenced in the triggering information received in step 601. In some embodiments, activity generation module 125 may employ information in device database 181 to determine whether devices referenced in the triggering information are compatible for use with use location 140.

In step 603, activity generation module 125 determines whether the device referenced in the triggering information and determined to be compatible for use with use location 140 is already associated with the account. For example, activity generation module 125 can make such a determination based on information stored in account database 183.

In step 604, activity generation module 125 updates the portion of account database 183 that corresponds to the account associated with use location 140. Specifically, activity generation module 125 updates the list of devices associated with use location 140 to include the device determined to be compatible for use with in step 603.

In step 605, activity generation module 125 generates programming for one or more activities that are supported by the device referenced in the triggering information in step 602. In some embodiments, activity generation module 125 generates such programming based on data stored in device database 181 and user configuration database 182. For example, in some embodiments, activity generation module 125 may retrieve statistical use data for the device referenced in the triggering information. Consequently, there is a high probability that the device configuration and connectivity included in the programming for activities supported by the new device will function properly with little or no feedback from the user.

In some embodiments, method 600 is performed in response to receiving a setup command from a user via an HID device associated with use location 140, for example client device 130. In this way, a user may initiate method 600, so that programming can be generated for activities supported by newly purchased devices, even when such devices have not yet been incorporated into use location 140.

In sum, embodiments of the present invention provide systems and techniques for programming a universal remote unit. Based on aggregated data associated with home networks using similar devices, programming for activities performed by a home network is generated either automatically, or with limited input and feedback from a user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a program for a universal control system, the method comprising:
    generating a list of devices associated with a network;
    based on statistical data associated with a first set of devices included in the list of devices, generating programming for a first activity to be performed via the network, wherein the statistical data comprises data setting forth a configuration between at least two devices included in the first set of devices, wherein the first activity is associated with the first set of devices included in the list of devices, and the programming is associated with a device configuration for the first set of devices and includes commands for transmission to the first set of devices by the universal control system; and
    causing the programming for the first activity to be stored, wherein, when the first activity is selected, the device configuration for the first set of devices is implemented.

2. The method of claim 1, further comprising:
    receiving feedback indicating that, when the device configuration for the first set of devices has been implemented, the first set of devices operates correctly; and
    modifying programming for a second activity to be performed via the network, wherein the second activity is associated with a second set of devices included in the list of devices, and the modified programming for the second activity is associated with a device configuration for the second set of devices and includes commands for transmission to the second set of devices by the universal control system.

3. The method of claim 2, further comprising generating the modified programming for the second activity based on configuration and operation data associated with each device in the list of devices.

4. The method of claim 2, further comprising, upon receiving the feedback, storing the device configuration for the first set of devices in a database that includes aggregated data for multiple networks.

5. The method of claim 2, wherein receiving feedback includes at least one of causing a query to be issued to a user to determine whether the first set of devices is operating correctly, causing an optical or sonic trigger to be generated by a device included in the first set of devices and detecting the optical or sonic trigger via a sensor in the universal control system, and receiving via the universal control system a wireless signal from a device included in the first set of devices.

6. The method of claim 1, further comprising:
    receiving feedback indicating that, when the device configuration for the first set of devices has been implemented, the first set of devices operates correctly; and
    generating programming for a second activity to be performed via the network, wherein the second activity is associated with a second set of devices included in the list of devices, and the generated programming for the second activity is associated with a device configuration for the second set of devices and includes commands for transmission to the second set of devices by the universal control system.

7. The method of claim 1, wherein the statistical data associated with each device in the list of devices includes data based on actual user configurations associated with each device in the list of devices.

8. The method of claim 1, further comprising:
    receiving feedback indicating that, when the device configuration for the first set of devices has been implemented, the first set of devices does not operate correctly;
    modifying the programming for the first activity by replacing at least a portion of the device configuration for the first set of devices with a new device configuration for the first set of devices; and
    causing the modified programming for the first activity to be stored, wherein, when the first activity is selected, the new device configuration for the first set of devices is implemented.

9. The method of claim 8, further comprising generating the new device configuration based on the feedback.

10. The method of claim 1, wherein generating the list of devices comprises receiving device information from the universal control system.

11. The method of claim 1, wherein generating the list of devices comprises receiving triggering information for an account associated with the network.

12. A non-transitory computer readable medium storing instructions that, when executed by a processor, cause the processor to perform the steps of:
  generating a list of devices associated with a network;
  based on statistical data associated with a first set of devices included in the list of devices, generating programming for a first activity to be performed via the network, wherein the statistical data comprises data setting forth a configuration between at least two devices included in the first set of devices, wherein the first activity is associated with the first set of devices included in the list of devices, and the programming is associated with a device configuration for the first set of devices and includes commands for transmission to the first set of devices by the universal control system; and
  causing the programming for the first activity to be stored, wherein, when the first activity is selected, the device configuration for the first set of devices is implemented.

13. The non-transitory computer readable medium of claim 12, further comprising the steps of:
  receiving feedback indicating that, when the device configuration for the first set of devices has been implemented, the first set of devices does not operate correctly;
  modifying the programming for the first activity by replacing at least a portion of the device configuration for the first set of devices with a new device configuration for the first set of devices; and
  causing the modified programming for the first activity to be stored, wherein, when the first activity is selected, the new device configuration for the first set of devices is implemented.

14. The non-transitory computer readable medium of claim 12, wherein generating the list of devices comprises receiving triggering information for an account associated with the network.

15. The non-transitory computer readable medium of claim 14, wherein generating the list of activities comprises determining a device capability for one or more devices included in the network.

16. The non-transitory computer readable medium of claim 12, wherein generating the programming for the first activity comprises generating the device configuration for the first set of devices.

17. The non-transitory computer readable medium of claim 12, wherein the statistical data include a device capability priority associated with each of the one or more devices.

18. A computing device comprising:
  a processor; and
  a memory that is coupled to the processor and includes instructions that, when executed, cause the processor to perform the steps of:
    generating a list of devices associated with a network;
    based on statistical data associated with a first set of devices included in the list of devices, generating programming for a first activity to be performed via the network, wherein the statistical data comprises data setting forth a configuration between at least two devices included in the first set of devices, wherein the first activity is associated with the first set of devices included in the list of devices, and the programming is associated with a device configuration for the first set of devices and includes commands for transmission to the first set of devices by the computing device; and
    causing the programming for the first activity to be stored, wherein, when the first activity is selected, the device configuration for the first set of devices is implemented.

19. The computing device of claim 18, wherein the network comprises at least one of a home automation system and a home entertainment system.

20. The computing device of claim 18, wherein the device configuration for the first set of devices includes a connectivity configuration among one or more devices included in the first set of devices.

21. The computing device of claim 18, wherein causing the programming for the first activity to be stored comprises at least one of transmitting the programming to the network for storage and storing the programming outside of the network.

* * * * *

UNITED STATES PATENT AND TRADEMARK OFFICE
CERTIFICATE OF CORRECTION

PATENT NO. : 9,996,069 B2
APPLICATION NO. : 14/935367
DATED : June 12, 2018
INVENTOR(S) : Stephen James Wheeler et al.

It is certified that error appears in the above-identified patent and that said Letters Patent is hereby corrected as shown below:

On the Title Page

(72) Inventors:
Please delete "Matthew Jonathan Dickinson, Berkeley, CA (US); John Craig Robert Degruchy, Ancaster (CA);" and insert --John Craig Robert Degruchy, Ancaster (CA); Matthew Jonathan Dickinson, Berkeley, CA (US);--.

Signed and Sealed this
Twenty-first Day of August, 2018

Andrei Iancu
*Director of the United States Patent and Trademark Office*